United States Patent [19]
Shumaker, Jr. et al.

[11] Patent Number: 5,902,536
[45] Date of Patent: May 11, 1999

[54] METHOD FOR SEALING AN ELECTRICAL CONNECTION TO A LAMINATED TRANSPARENCY

[75] Inventors: Robert T. Shumaker, Jr., Manorville; Randy R. Kadunce, New Kensington, both of Pa.

[73] Assignee: PPG Industries Ohio Inc., Cleveland, Ohio

[21] Appl. No.: 08/713,915

[22] Filed: Sep. 13, 1996

[51] Int. Cl.⁶ .......................... B29C 33/20; B29C 45/14; B29C 70/72; B29C 70/80
[52] U.S. Cl. ..................... 264/263; 264/267; 264/271.1; 264/272.15
[58] Field of Search ..................... 264/261, 263, 264/271.1, 272.11, 272.15, 275, 277, 278, 267, 254, 104

[56] References Cited

U.S. PATENT DOCUMENTS

| | | | |
|---|---|---|---|
| 3,655,545 | 4/1972 | Gillery et al. | 204/192 |
| 3,962,488 | 6/1976 | Gillery | 427/109 |
| 3,987,449 | 10/1976 | DeAngelis et al. | 343/713 |
| 4,707,700 | 11/1987 | Nagy | 343/712 |
| 4,768,037 | 8/1988 | Inaba et al. | 343/713 |
| 4,849,766 | 7/1989 | Inaba et al. | 343/713 |
| 4,898,789 | 2/1990 | Finley | 428/623 |
| 5,083,135 | 1/1992 | Nagy et al. | 343/713 |
| 5,135,694 | 8/1992 | Akahane et al. | 264/272.11 |
| 5,213,828 | 5/1993 | Winter et al. | 428/46 |
| 5,355,144 | 10/1994 | Walton et al. | 343/713 |
| 5,416,491 | 5/1995 | Nishikawa et al. | 343/713 |
| 5,620,648 | 4/1997 | Volkmann et al. | 264/271.1 |

*Primary Examiner*—Angela Ortiz
*Attorney, Agent, or Firm*—Andrew C. Siminerio; Donald C. Lepiane

[57] ABSTRACT

The present method includes an apparatus for filling and sealing an opening in a laminate and in particular sealing the cut-out notch area of a vehicle windshield. A mold fixture includes a mold, a backing plate, a sealant inlet and a vent. The mold has resilient sealant contacting surfaces that provide a smooth surface for forming the surface of the sealant filling the opening. The mold fixture is clamped to the laminate such that selected portions of the mold overlay the opening and remaining portions of the mold overlay selected portions of the laminate immediately adjacent the opening. Sealant is injected into a cavity formed by the laminate and the mold fixture to seal the opening. The sealant is allowed to cure to achieve a desired hardness and the mold fixture is then removed from the laminate.

19 Claims, 4 Drawing Sheets

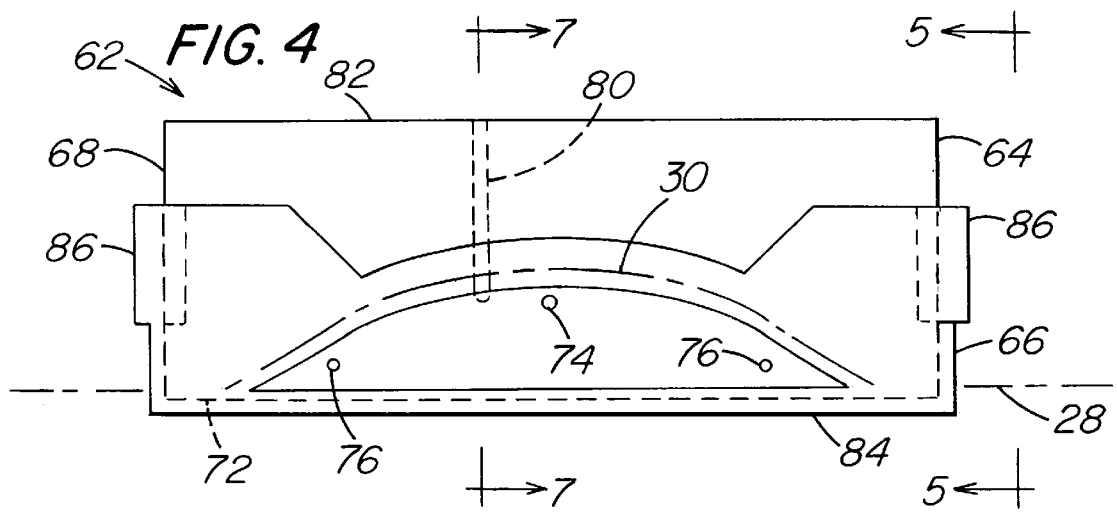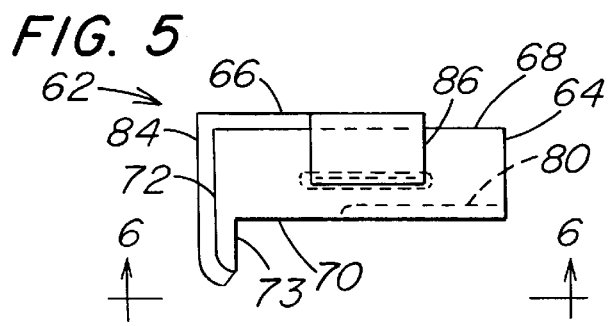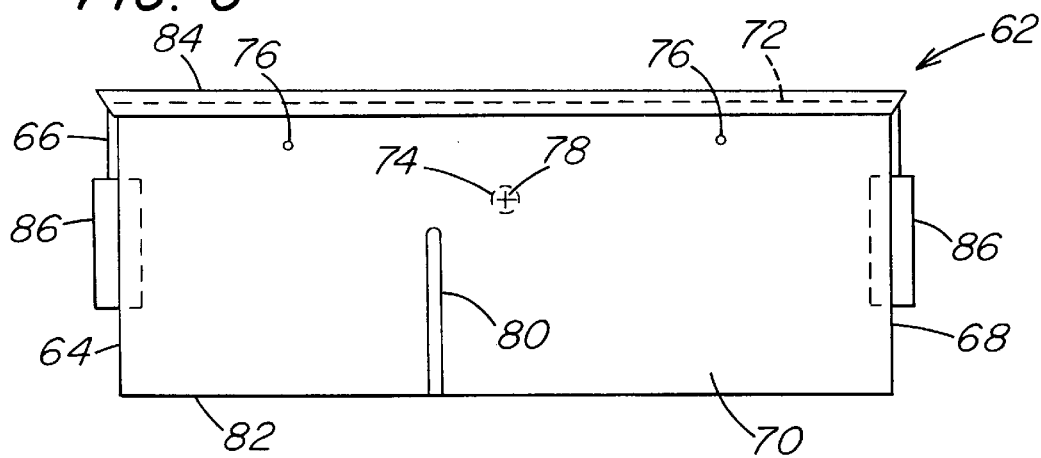

METHOD FOR SEALING AN ELECTRICAL CONNECTION TO A LAMINATED TRANSPARENCY

BACKGROUND OF THE INVENTION

1. Field of the Invention

The present invention relates to filling and sealing openings in a laminate and in particular to an apparatus and method for sealing the electrical connection area of an antenna formed between the two glass plies of a laminated transparency.

2. Technical Considerations

In the past, the traditional motor vehicle antenna for receiving and transmitting electromagnetic signals was a mast or whip-type antenna. Recently there has been a trend towards incorporating the antenna into the vehicle structure. For example, U.S. Pat. No. 3,987,449 to DeAngelis et al. discloses a wire antenna laminated within a vehicle windshield. U.S. Pat. No. 4,707,700 to Nagy positions an antenna within the roof structure of a vehicle. U.S. Pat. No. 5,416,491 to Nishikawa et al. forms antenna elements on a window using electroconductive ceramic paints. U.S. Pat. Nos. 4,768,037 and 4,849,766 to Inaba et al. and 5,355,144 to Walton et al. use a transparent electroconductive coating laminated between two glass plies to form an antenna. U.S. Pat. No. 5,083,1 35 to Nagy et al. utilizes a transparent coating in the form of a "T" to form an antenna. In each system, the connector arrangement conducts the signals received by the antenna to a receiver, for example a radio.

In order to feed the signals received by the antenna element to a signal receiving device, connectors, such as wires, braids or metal tabs, have been used. When the antenna is formed from electroconductive elements laminated with a transparency, e.g. a windshield, problems arise when these connector elements are also laminated within the transparency. In particular, it has been found that when incorporating these types of connectors between the plies of the glass laminate, air may be entrapped within the laminate in the vicinity of the connector. It is believed that the connector hinders de-airing of the laminate during a conventional roll prepress operation. The bubbles formed by the entrapped air detract from the aesthetics of the window as well as increase the possibility of delamination at or near the connector. To avoid this problem, a notch may be cut along the edge of one of the glass plies to facilitate electrical connection to antenna elements that extend within the notch area, e.g. as disclosed in U.S. Pat. Nos. 3,987,449 and 4,849,766. A similar approach is disclosed in U.S. Pat. No. 5,213,828 to Winter et al. where electrical connection was required to be made to electroconductive elements of an electrically heatable windshield. To protect the connection and seal the notch area, the notch area is filled with a sealant material which is typically applied to the notch area and smoothed with a putty knife or other similar tool. As an alternative, tape may be used to cover the notch area and the sealant is injected into the notch beneath the tape. These sealing procedures are slow and do not provide consistent, reliable results. In particular, it is difficult to ensure that the notch area is completely filled. In addition, the exposed surfaces of the sealant material along the major surface of the windshield and along its edge may be irregular. This may pose a problem when adhesive is applied about the marginal edge of the windshield before it is mounted in a vehicle.

It would be advantageous to provide an arrangement where the notch area is effectively filled quickly and consistently, and further provides a smooth finish along the sealant surface.

SUMMARY OF THE INVENTION

The present invention provides a mold fixture for filling and sealing an opening in a laminate. The mold fixture includes a mold, a backing plate, a sealant inlet and a vent. The mold has resilient sealant contacting surfaces that provides a smooth surface for forming the surface of the sealant filling the opening. In the instance where the opening in the laminate is a cut-out notch area formed along the edge of the laminate, in one particular embodiment of the invention, the mold includes a first section having first resilient sealant contacting surface and first opposing surface and a second section extending generally perpendicular from the first section. The second section has a second resilient sealant contacting surface extending from the first resilient surface of the first section and a second opposing surface. The backing plate overlays selected portions of the first and second opposing surfaces.

The present invention also discloses a method of sealing a opening in a glass laminate. The laminate includes a first sheet laminated to a second sheet and the opening extends at least through the first sheet. A mold fixture having a mold with resilient sealant contacting surfaces is positioned on the laminate such that selected portions of the mold overlay the opening and remaining portions of the mold overlay selected portions of the laminate immediately adjacent the opening. The mold fixture is secured to said laminate such that the opening is sealed against the resilient mold surfaces and the mold and laminate form an enclosed cavity. Sealant is injected into the cavity to seal the opening and allowed to cure to achieve a desired hardness. The mold fixture is then removed from the laminate. In the instance where the opening is formed along an edge of said first sheet of the laminate, in one particular embodiment of the invention, the mold fixture is positioned along the edge of the laminate such that first portions of the mold extend along selected portions of a major surface of the laminate immediately adjacent the opening and second portions of the mold extend along selected portions of the edge of said laminate immediately adjacent the opening. The mold fixture is clamped to the laminate to hold it in place.

BRIEF DESCRIPTION OF THE DRAWINGS

FIG. 4 is a plan view of the mold fixture of the present invention.

FIG. 5 is an end view of the mold fixture taken along line 5—5 of FIG. 4.

FIG. 6 is a view taken along line 6—6 of FIG. 5.

DETAILED DESCRIPTION OF THE INVENTION

The present invention is disclosed in combination with an antenna system for an automotive windshield. However, it should be appreciated that the present invention may be used in other applications where an opening or other cut-out area of a structure must be filled, and in particular in combination with other types of systems that require electrical connection to conductive elements within a notch area or other opening in a glass laminate.

Figure 1:
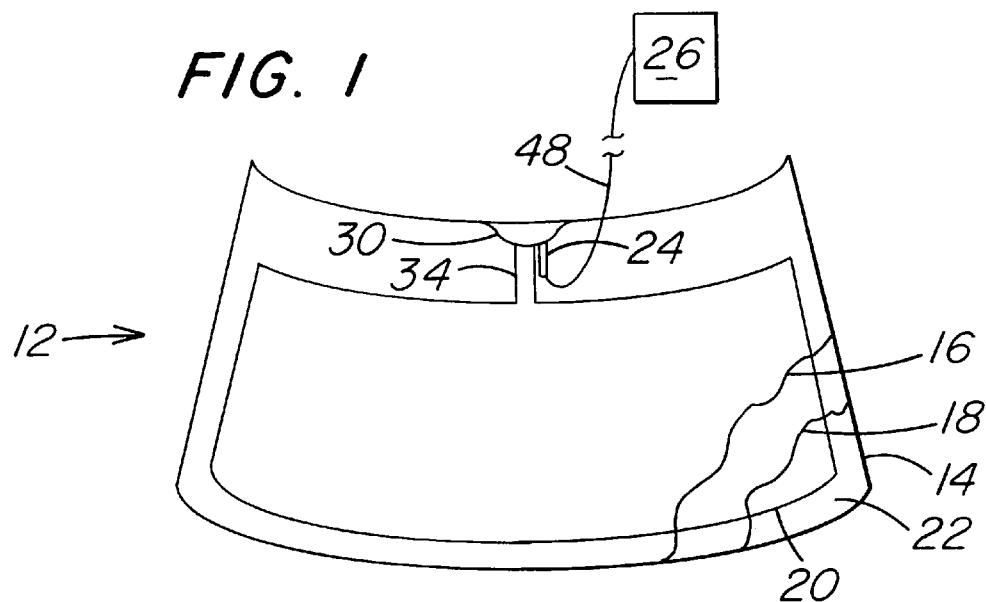
FIG. 1 is a plan view of a laminated glass antenna with an electrical connection made within a notch area along an edge of the laminate.

FIG. 1 illustrates a laminated vehicle windshield 12 formed by outer and inner glass plies 14 and 16, respectively, which are bonded together by a plastic interlayer 18, preferably polyvinyl butyral. Plies 14 and 16 may be other transparent rigid materials, for example acrylic, polycarbonate, or the windshield 12 may include a combination of different transparent, rigid materials. Windshield 12 further includes at least one antenna element 20. In the particular antenna configuration illustrated in FIG. 1, the antenna element 20 is a transparent electroconductive coating applied on surface 22 of glass ply 14 in any manner well known in the art, and generally occupies the central portion of the windshield 12. The coating may be a single or multilayered metal containing coating, for example as disclosed in U.S. Pat. No. 3,655,545 to Gillery et al.; 3,962,488 to Gillery; and 4,898,789 to Finley. It should be appreciated that the antenna element 20 may have a configuration different from that shown in FIG. 1. For example, element 20 may be T-shaped as shown in U.S. Pat. No. 5,083,135 or may include multiple antenna elements having various shapes that are either directly or indirectly electrically interconnected.

Although the antenna element 20 discussed above is a transparent coating, if the antenna element is not positioned in the major vision area of the windshield 12 or does not obstruct the main viewing area of the vehicle transparency, antenna element 20 may be a nontransparent electroconductive material, for example silver-containing ceramic paint, wires, metal foil, etc. In addition, the antenna may include a combination of coating, wire and/or ceramic antenna elements.

With continued reference to FIG. 1, antenna element 20 in this particular configuration is basically quadrilateral in shape and preferably spaced from the peripheral edge of the windshield 12. The exact shape and position of element 20, as well as any additional antenna elements depends in part on the design of the vehicle into which the windshield 12 is installed, the angle of windshield installation, the coating resistivity, the type of signal to be transmitted or received and the desired performance of the antenna. These types of design considerations for a transparent glass antenna are discussed in U.S. Pat. Nos. 4,768,037; 4,849,766 and 5,083,135.

Figure 2:
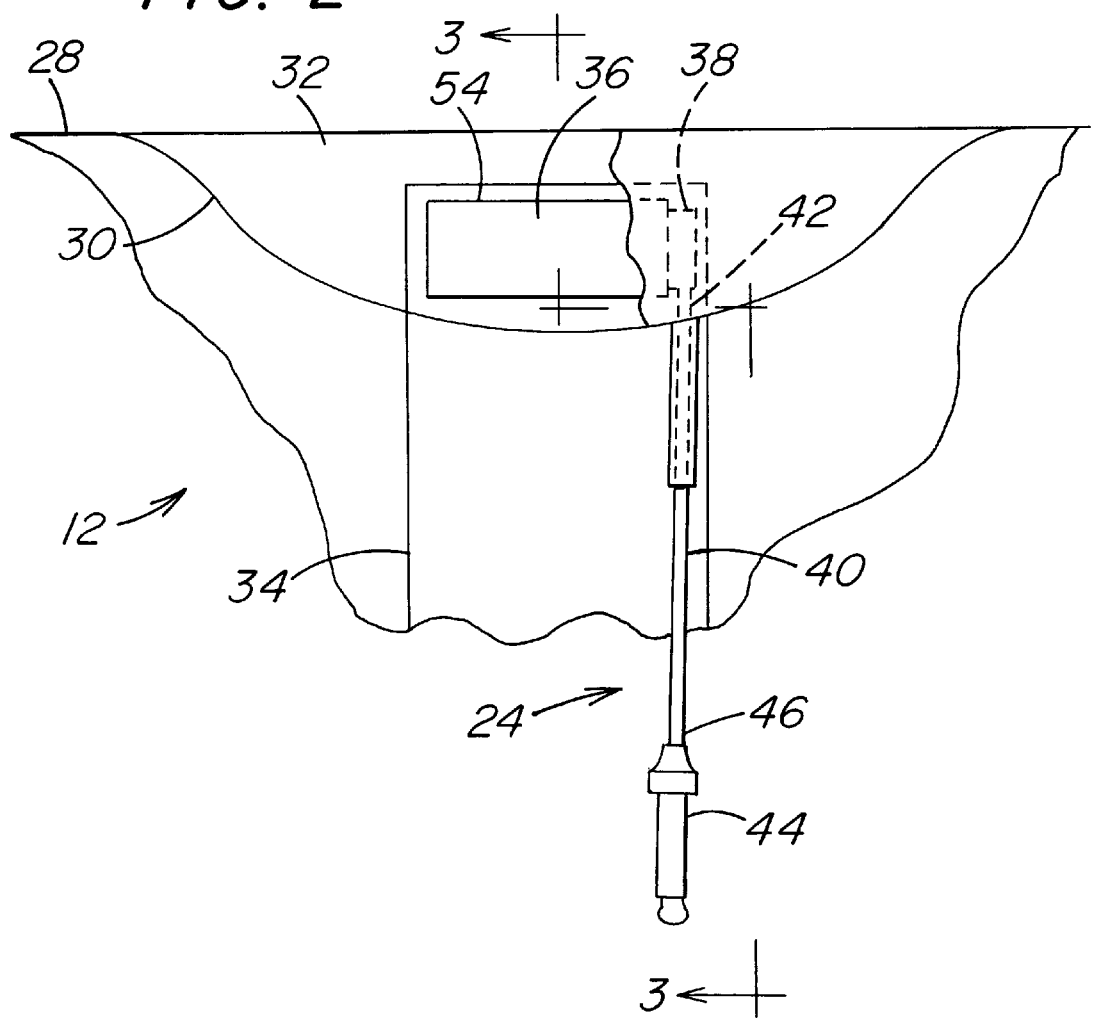
FIG. 2 is an enlarged plan view of the connection area of the antenna illustrated in FIG. 1.
Figure 3:
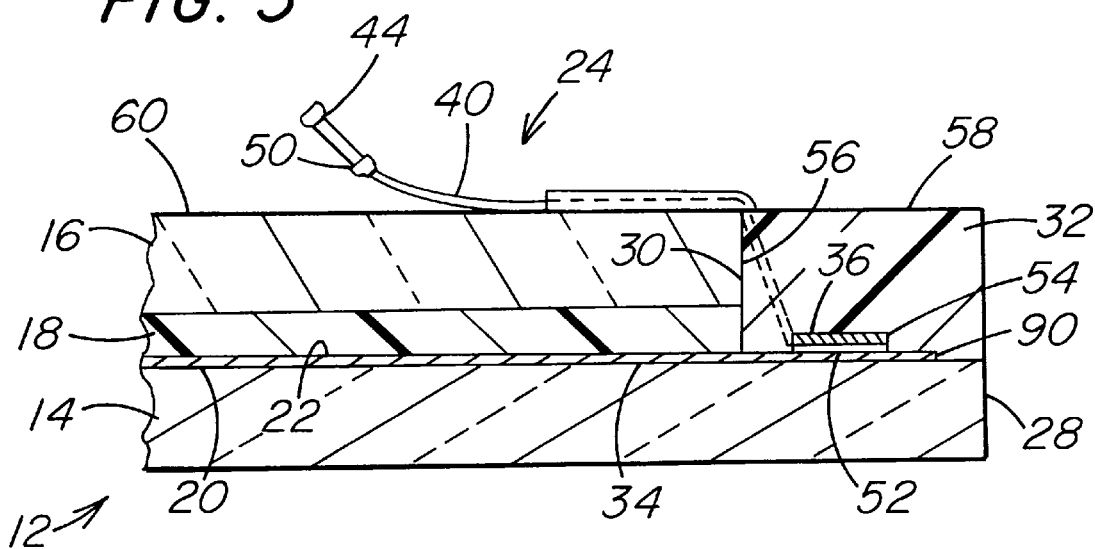
FIG. 3 is a view taken along line 3—3 of FIG. 2.
Figure 7:
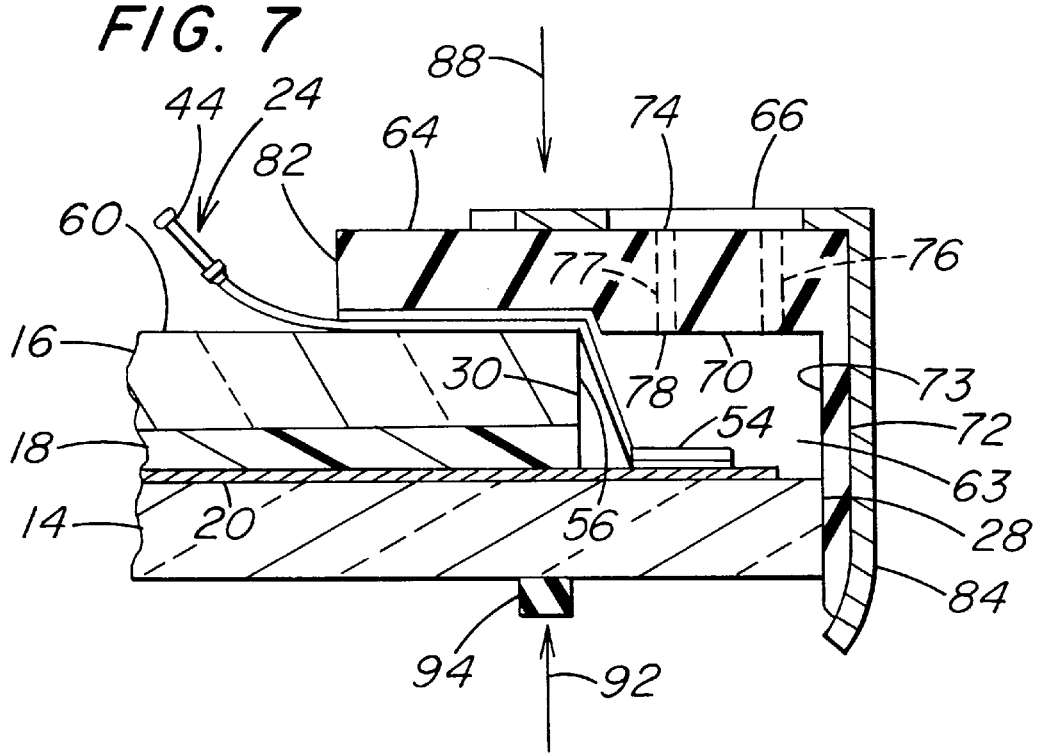
FIG. 7 is a sectional section similar to that shown in FIG. 3 taken along line 7—7 of FIG. 4, with the mold fixture positioned at the notch area of the laminate, with portions removed for clarity.

Referring to FIGS. 2 and 3, a connector 24 provides a connection between the antenna element 20 and an electromagnetic energy transmitting and/or receiving device 26 (shown only in FIG. 1) and is fixed to the windshield 12, as will be discussed later in more detail. Device 26 may be a radio, cellular phone, television, global positioning system or any other type of system that uses antenna element 20 to transmit and/or receive signals. Although not required, in the particular antenna arrangement shown in FIG. 1, the connector 24 is positioned along the upper edge 28 of the windshield 12. The connection arrangement between the connector 24 and antenna element 20 is configured such that the connector 24 is not laminated between plies 14 and 16. In this manner, the problem of entrapped air resulting from a connector being laminated within the windshield 12 is eliminated. More specifically, a notch area 30 is cut out of the inner ply 16 along the upper edge 28 of the windshield 12, as shown in FIGS. 1–3. In one particular embodiment of the connector arrangement, a corresponding section of the interlayer 18 is removed from the notch area 30. Connector 24 is adhered to a portion of the antenna element 20 that extends into the notch area 30 and the notch area 30 is filled with a sealant material 32 to further secure the connector 24 in place and seal the notch area 30, as will be discussed later in more detail. Where the antenna and notch area configuration are such that a portion of antenna element 20 passes through the notch area 30, the connector 24 is secured directly to element 20. As an alternative, the antenna element 20 may include an extension 34 which extends the antenna element 20 into the notch area 30 and provides an arrangement whereby the connector 24 may be electrically coupled to the antenna element 20. Although not required, the extension 34 may be made of the same material as element 20. It is preferred that the element 20 or extension 34 should not extend to the edge 28 of the windshield 12 at notch area 30 but rather terminate at least 1 mm from the edge 28 to ensure that the electroconductive antenna elements are completely sealed within the notch area 30 by sealant 32 to inhibit degradation of the antenna element along edge 28.

Connector 24 is preferably fabricated from stainless steel, copper, tin, brass or any other electroconductive material. If required, combinations of materials, such as stainless steel or brass coated with copper, tin or silver, may be used to enhance conductivity, strength and chemical durability. In the particular embodiment illustrated in FIGS. 2, 3 and 8, connector 24 includes a pad section 36 which overlays and is in electrical contact with a portion of extension 34 of antenna element 20, a section 38 along one edge of the pad 36, and an insulated connecting wire 40 which is secured to section 38. Section 38 is positioned along an edge of pad 36 so as to provide an unobstructed upper surface along which pressure may be applied to secure the connector 24 to extension 34. End 42 of wire 40 extends within section 38 and is secured thereto in any convenient manner, e.g. by crimping section 38 around end 42 and/or soldering the wire in place. In this connector embodiment, sections 36 and 38 are formed by a continuous metal member so that they are integral with each other. The electrical contact made by section 36 with extension 34 may be a direct connection or a capacitive connection, as will be discussed later in more detail. Connecting wire 40 includes a terminal assembly 44, e.g. a male JASO pin as shown in FIGS. 2 and 3 or other electrical connecting device well known in the art, connected to end 46 of wire 40 so that a coaxial cable 48 (shown only in FIG. 1) from device 26 may be easily secured to connector 24. Wire 40 is insulated to prevent the connector 24 from contacting the vehicle in which windshield 12 is installed and adversely effecting the performance of the antenna. In addition, a nonconductive shrink-wrap cover 50 may be applied to assembly 44 near end 46 of wire 40 to further insulate the connector 24 and make it easier to handle assembly 44.

Figure 8:
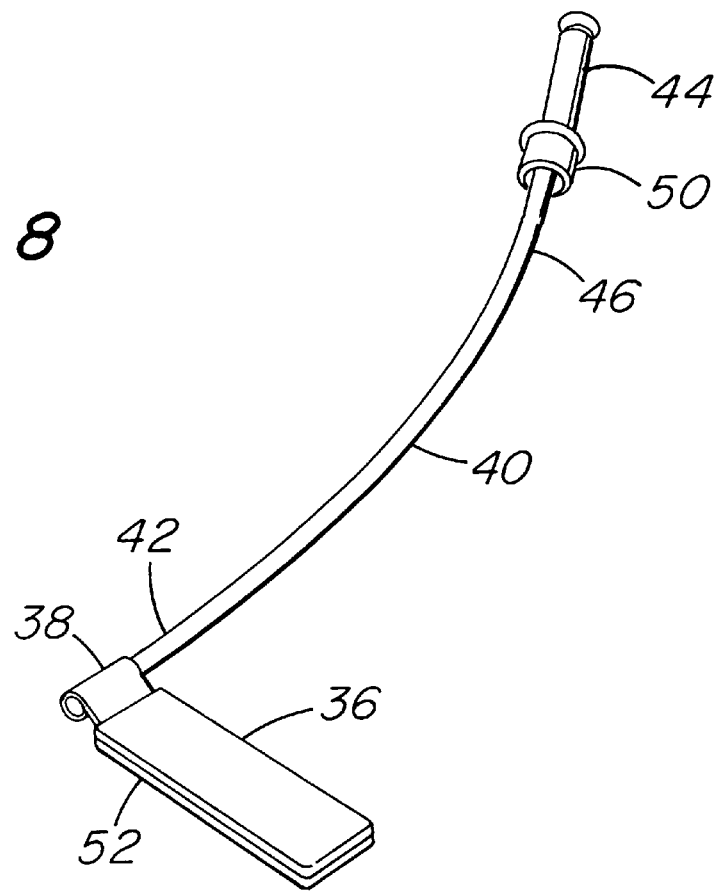
FIG. 8 is an isometric view of the connector used with the notch area.

An adhesive 52, shown only in FIG. 3 and 8, is applied to section 36 to secure the connector 24 to antenna element 20 on outer glass ply 14. As discussed earlier, the electrical connection between the connector 24 and element 20 may be either a direct connection or a capacitive connection. More particularly, the adhesive 52 may be electrically conductive to provide a direct electrical connection between connector 24 and antenna element 20, or it may be electrically nonconductive so that the electrical connection is capacitive. It has been found that a capacitive connection may be used to produce a capacitive reactance that matches the inductive reactance of the antenna to the coaxial cable 48 (shown only in FIG. 1) used to connect the antenna element 20 to the transmitting/receiving device 26, by minimizing the net reactive component as disclosed in U.S. Pat. No. 5,355,144. The required surface area of the section 36 of the connector 24 is based in part, on the spacing between section 36 and antenna elements 20, i.e. the adhesive thickness, the types of materials used for the antenna element, connector and adhesive, and the desired type of connection, i.e. direct or capacitive. In instances where there is direct electrical connection between connector 24 and element 20, it may be desirable to have the surface area provided by pad section 36 large enough so that in the event a conductive adhesive 52 fails, the connector 24 may still maintain a capacitive connection that permits the continued operation of antenna element 20. If desired, colorants may be added to the adhesive 52 to hide the connector 24 when viewed through the outer surface of the windshield 12.

The sections 36 and 38 of the connector 24 are preferably made from tin plated brass or tin plated stainless steel with a base metal thickness ranging from 0.002 to 0.02 in. (0.051 to 0.51 mm), and more preferably ranging from 0.005 to 0.007 in. (0.13 to 0.18 mm). When unplated connectors are used, and in particular, stainless steel connectors, it may be required to buff the lower surface of the pad section 36 with an abrasive prior to applying a conductive adhesive 52 to remove any oxide layer and ensure good electrical contact between the connector and antenna element 20 or extension 34. Adhesive 52 may be a double-face tape, adhesive spray or any other type of adhesive system well known in the art.

As discussed earlier, the connector 24 is positioned within the notch area 30 along the edge 28 of windshield 12. The notch area 30 must be large enough to accommodate the connector 24 as well as provide sufficient spacing between edge 54 of the connector 24 and edge 28 of the windshield 12 to ensure that the sealant 32 completely covers and seals connector 24 within the notch area 30 and provides a continuous moisture barrier along windshield edge 28 and notch edge 56. The spacing between connector edge 54 and windshield edge 28 should be at least 1 mm, and preferably at least 3 mm.

The notch area 30 is filled with a non-conductive sealant 32 to protect and further secure the connector 24 in place, to seal the portion of the antenna element 20 within notch area 30 and to seal the exposed edge 56 of the notch area 30 by forming a moisture barrier. In addition, is preferred that surface 58 of the sealant 32 align with surface 60 of inner glass ply 16 to provide a smooth, hard, uninterrupted surface along the marginal edge portion of the inner major surface of the windshield 12. This smooth surface quality along the sealant 32 in the notch area 30 is provided by a mold fixture, which will discussed later in more detail. Although not limiting in the present invention, the sealant 32 is preferably a room temperature curable material that may be injected into the notch area 30 and provide a hard surface when cured, preferably a Shore A hardness of at least about 85. Furthermore, the sealant 32 should not adversely effect the materials forming the antenna element 20 or extension 34 in a manner that will electrically isolate the connector 24 from the antenna. Sealants that have been used to fill and seal the notch area 30 include room temperature curable epoxies, such as Plastilok® 421 epoxy available from BF Goodrich, Adhesives Systems Division, Akron, Ohio and Scotch-Weld® DP-110 epoxy available from 3M Industrial Tape and Specialty Division, St. Paul, Minn., both of which are two-part flexible epoxy sealants.

In the present invention, a mold fixture is used to enclose the notch area 30 and shape the sealant 32 during the notch filling and curing operation. Referring to FIGS. 4–7, mold fixture 62 is secured along edge 28 of the windshield 12 overlaying the notch area 30 and portions of glass surface 60, forming an enclosed cavity 63 which will be filled with sealant 32, as will be discussed later. The fixture 62 includes a resilient mold 64 and rigid backing plate 66. Mold 64 is preferably made of a material that will not stick to the sealant 32 and will withstand elevated temperatures of up to 200–350° F. (93–177° C.) without adversely affecting the mold, for reasons to be discussed later. In addition, the surface of mold 64 overlaying the windshield 12 and notch area 30 should have a smooth finish, which not only results in the filled notch having a smooth finish but also makes it is easier to remove the mold fixture 62 from the cured sealant. The mold surface 70 should also be resilient so that it may seal flush against portions of surface 60 and conform to any irregularities. However, the mold surface should not be so soft that it looses its shape as the sealant 32 is injected into cavity 63 through inlet 74 of the mold 64 to fill the notch area 30, as will be discussed later in more detail. It is preferred that the mold have a Shore A hardness of about 50–70, preferably 55–65. Although not limiting in the present invention, the mold 64 may be made of Silastic® M RTV rubber available from Dow Corning Corp., Midland, Mich. This mold material is a two component silicone rubber that provides a Shore A hardness of about 55–57 and a smooth surface quality. As an alternative to constructing the entire mold 64 of a single material, it is contemplated that the mold 64 may include a more rigid base material and just the surface of the mold 64 which contacts the windshield 12 and overlays the notch area 30 be constructed from a resilient material with the desired hardness.

Referring to FIGS. 4–7, mold 64 includes a main section 68, with a generally flat surface 70 that overlays notch area 30 and portions of glass surface 60, and a lip section 72 with a surface 73 that extends along edge 28 of windshield 12 to seal the notch area 30. Section 68 includes a sealant inlet 74 and vent holes 76. Although not limiting in the present invention, inlet 74 includes a chamber 77 which extends partially but not completely through section 68. The remaining thickness of the mold portion 68 is slit from the chamber 77 to mold surface 70. As a nozzle (not shown) is inserted into inlet 74 to inject sealant 32 into the notch area 30, slit 78 is forced open. When the notch area is filled, the nozzle is removed and slit 78 closes to maintain the sealant within the notch area 30 as it cures. In addition, the closed slit 78 provides a smooth surface along mold surface 70, resulting in a corresponding smooth notch area surface 58.

Mold 64 also includes a groove 80 which extends from edge 82 along the mold surface 70. Groove 80 is sized to receive a portion of wire 40 of connector 24 during the notch area filling operation and hold it along the windshield 12 so that section 68 of mold 64 may be seated flush against surface 60 of glass ply 16. During the notch filling operation, sealant flows into groove 80 adhering a portion of wire 40 to surface 60. This arrangement reduces the possibility of connection 24 interfering with a windshield adhesive application and mounting system (not shown) which applies a bead of adhesive about the marginal edge of the windshield 12 along surface 60. As an alternative, the depth of the notch area 30 may be increased to move the connector 24 further inward from edge 28 of the windshield 12 a sufficient distance such that wire 40 is spaced from any adhesive that is subsequently applied about the marginal edge portion or periphery of the windshield 12 to hold the windshield in place in a vehicle.

Backing plate 66 provides rigidity to the mold fixture 62 and maintains the mold shape during the notch filling operation. In addition, backing plate 66 distributes the pressure applied to selected portions of the mold fixture 62 when it is secured to windshield 12. Referring to FIG. 5, portion 84 of plate 66 is folded over lip 72 of the mold 64 to seal the fixture 62 against windshield edge 28 and ensure that sealant 32 does not leak from the notch area 30 during the notch filling and subsequent curing operation. In the particular embodiment of the mold fixture 62 illustrated in FIGS. 4–6, plate 66 also includes tabs 86 which are received within corresponding cavities of section 68 to hold mold 64 and backing plate 66 together and prevent large deflection in the mold 64 when fixture 62 is secured to the windshield 12.

Fixture 62 is secured to windshield 12 in any convenient manner. Although not limiting to the present invention, in one particular embodiment, fixture 62 is clamped to windshield 12 by applying a force (indicated by arrow 88 in FIG. 7) to backing plate 66 along a line slightly outboard of the notch area 30 and a corresponding force along glass ply 14 (indicated by arrow 92 in FIG. 7). This later force is preferably applied through a rubber gasket 94 or other resilient material so as to distribute the force and avoid glass breakage. Concentrating the forces in these areas ensures a good seal between the fixture 62 and windshield 12 along the notch area 30. If desired, the mold fixture 62 may be secured to a clamping arrangement, e.g. by screws or some other type of connector system, so that the fixture 62 may be positioned over the notch area 30 and secured to the windshield 12 in one continuous operation. One or more cavities (not shown) may also be provided along that portion of surface 70 which overlays surface 60 of glass ply 16 and a vacuum may be drawn through the cavities to further secure the mold fixture 62 to the windshield 12.

Backing plate 66 may be made of any rigid material that will distribute the clamping forces along the mold fixture 62. Although not limiting in the present invention, in one embodiment, plate 66 was a 0.080 inch (2.03 mm) thick aluminum plate.

In one particular antenna configuration, the antenna element 20 was a transparent, electroconductive multilayered coating centered on surface 22 of glass ply 14 within the main viewing area of the windshield 12 and having a resistivity of approximately 3 ohms per square. The distance from the edge of the antenna element coating to the edge of the windshield 12 varied, with a minimum spacing between the main portion of the coating forming antenna element 20 and the metal frame (not shown) surrounding the windshield 12 of 0.25 inches (6.4 mm). An extension 34 was used to bridge the space between the antenna element 20 and the notch area 30 as shown in FIGS. 1 and 2. Although not required, it is preferred that the notch area be located in the central portion of the windshield 12, i.e. within the central third of the windshield 12 and more preferably at the center of windshield 12. Extension 34 was a coating identical to and applied at the same time as the antenna element 20. Extension 34 was 1 in. (25.4 mm) wide to accommodate the full width of pad section 36 of the connector 24, which is discussed below. In this particular embodiment of the antenna, edge 90 of extension 34 was spaced approximately 0.55 inches (14 mm) from edge 28 of the windshield to prevent electrical coupling of the metal coating to the underlying vehicle frame through the urethane adhesive used to secure the windshield 12 into the opening in the vehicle. It is believed that this electrical coupling will adversely affect the performance of the antenna. The notch area 30 was approximately 1.06 in. (27 mm) deep and 3.94 in. (150 mm) wide. Mold portion 68 was approximately 2.5 in. by 6.5 in. by 0.438 in. thick (6.35 cm by 16.51 cm by 1.11 cm) to cover the notch area 30 and adequately overlap portions of surface 60 to provide a proper seal. Lip portion 72 extended downward approximately 0.312 in. (7.92 mm) from portion 68 to seal the edge of the notch area 30 along windshield edge 28. If desired, surface 73 of leg 72 may be contoured to follow any curvature along windshield edge 28.

Sections 36 and 38 of connector 24 were a tin plated brass member approximately 0.007 in. (0.178 mm) thick throughout. Section 36 was approximately 0.31×0.79 in. (8×20 mm) and positioned so that it is completely on the extension 34 and there was a minimum of 0.59 inches (15 mm) between edge 54 of section 36 and edge 28 of the windshield 12. Wire 40 was a 20 gauge insulated wire with a JASO pin secured to end 46. Section 36 was secured to extension 34 by a double-sided electrically conductive adhesive tape approximately 0.002 in. (0.051 mm) thick, for example product no. CD-9082 tape, available from Specialty Tapes, Wis., to make a direct electrical connection. As an alternative, an electrically nonconductive adhesive, for example Product No. 9482, available from 3M Company may be used to secure section 36 to the extension 34 (or element 20) and form a capacitive connection.

The notch area 30 was filed with Scotch-Weld DP-110 epoxy. This particular sealant was modified by adding silane, e.g. Dow Corning® Z-6040 silane, available from Dow Corning, Midland, Mich. to the epoxy resin component in an amount equal to approximately 0.2–8 wt. % of the resin, and preferably 0.5–2 wt. %, to improve bonding of the sealant to the glass. In addition, carbon black, for example Arospere™ 11V carbon black available from J. M. Huber Corporation, Borger, Tex., was added to "hide" the filled notch by providing a black appearance consistent with a black ceramic border (not shown) which is typically applied about the marginal edge portion of an automotive vehicle windshield. In this particular embodiment, the carbon black was added to the accelerator component in an amount equal to approximately 1–1.5 wt. % of the accelerator. The sealant was applied using a static mix applicator that mixed equal amounts of the two-part epoxy immediately prior to its injection into the notch area 30. As applied, the sealant sets up in about 15 minutes so that it could be handled more easily. When completely cured, the epoxy has a Shore A hardness of about 88. As an alternative, W041 696 T1 Black, which is a two part structural adhesive available from Advanced Polymer Concepts, Germantown, Wis., may also be used. This later material provides a Shore A hardness of about 95.

In fabricating the windshield 12 described above, the transparent electroconductive coating was applied to glass ply 14 in any manner well known in the art, using a mask to provide the desired antenna pattern. As an alternative, the entire surface 22 of ply 14 may be coated and thereafter selected portions of the coating removed to provide the desired antenna pattern. After coating, ply 14 was combined with ply 16, which includes the cut-out area corresponding to notch area 30, and the two plies were shaped simultaneously using techniques well known in the art, for example gravity sag bending. If desired, plies 14 and 16 may be shaped individually and/or prior to applying the antenna element 20. After shaping, the interlayer 18 was inserted between plies 14 and 16 with a cut out section in the interlayer corresponding to the notch area 30. The entire assembly was then deaired and laminated using techniques well known in the art, to form a unitary structure. After lamination, the notch area 30 was wiped clean and pad section 36 of connector 24 was secured to extension 34. Mold fixture 62 was then placed over the notch area 30 with wire 40 extending from the mold 64 through groove 80 and clamped in place. The sealant 32 was then injected through inlet 74 of the mold 64 into the notch area 30. After filling, the sealant 32 was allowed to set and cure for about 20 minutes to achieve a desired surface hardness before the mold fixture 62 was removed. It is noted that the cure time for the sealant may be reduced by heating the mold fixture 62 and/or heating the notch area 30 before, during, and/or after filling to a temperature of about 200–350° F. (73–177° C.). For this reason, if heating is used to accelerate curing, the mold material must be able to withstand these elevated temperatures. In addition, the sealant 32 itself may be heated during the notch filling operation to reduce its viscosity and reduce its cure time. Care should be taken in heating the sealant to ensure that it is not heated to too high of a temperature, resulting in the chemical breakdown of the sealant.

Although the invention as discussed above included only one electrical connection to the antenna element 20, it should be appreciated that multiple connections to the antenna element 20 may be made along one or several edges of the windshield 12 in a manner similar to that disclosed herein.

Figure 9:
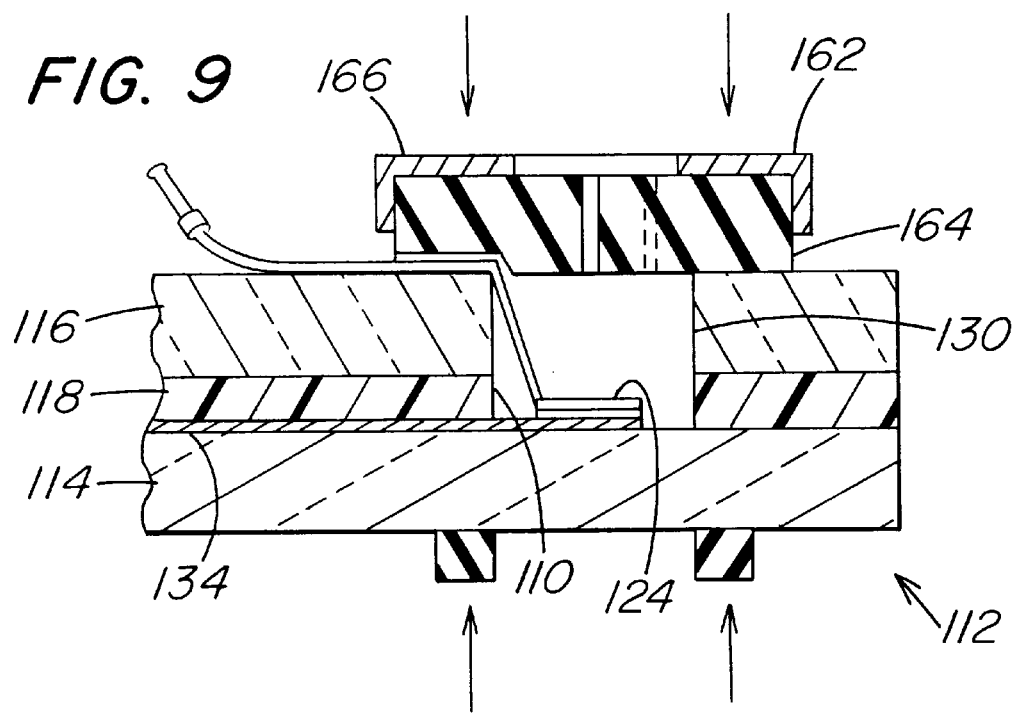
FIG. 9 is a sectional view similar to FIG. 7 of an alternate embodiment of the invention.

As disclosed herein, the mold fixture 62 is used to seal an electrical connection made at a notch area 30 positioned along an edge of the windshield 12. However, the teachings of the present invention may also be used to seal a connection made at an opening in the windshield spaced from its edge. More specifically, referring to FIG. 9, glass ply 116 includes a hole 130 within its periphery which is positioned to overlay electroconductive extension 134 on glass ply 114 of windshield 112. A corresponding hole 110 is formed in interlayer 118. A connector 124 is positioned within the hole 130 and secured to the extension 134. A mold fixture 162 having a resilient mold 164 and backing plate 166, similar to that discussed earlier may be secured to the windshield 112 in any convenient manner to cover the hole 130. Sealant (not shown) could then be injected through the mold fixture 162 to seal the hole 130 and further secure the connector 124 in place.

The invention described and illustrated herein represents a description of illustrative preferred embodiments thereof. It is understood that various changes may be made without departing from the gist of the invention defined by the claims that follow.

We claim:

1. A method of depositing material in a recess in an article, the article having a first surface and an opposite surface defined as a second surface, the recess defined by wall portions interconnecting the first surface and a base, the base spaced from the second surface, comprising the steps of:

positioning resilient surface of a mold over the recess, to rest on the first surface and to cover the recess, the resilient surface of the mold facing the recess made of a material that is non-adherent to the material to be deposited in the recess;

biasing the mold toward the first surface to urge the resilient surface of the mold against the first surface to provide a cavity to receive the material;

moving the material in a fluid state into the cavity to fill the recess with the material;

solidify the material in the recess to a desired hardness, and removing the mold from the first surface of the article.

2. The method of claim 1, further including the step of providing a mold having a resilient portion, the resilient portion having the resilient surface to rest on the first surface of the article and a rigid plate on the resilient portion opposite the resilient surface, wherein said providing step is practiced before said positioning step and said positioning step includes biasing the rigid plate toward the article.

3. The method of claim 1 wherein the article is a laminate including a glass sheet adhered to a substrate and the first surface of the article is outer surface of the glass sheet defined as first surface of the laminate and the recess is a cutout in the glass sheet.

4. The method of claim 3 wherein the laminate includes a pair of glass sheets laminated together by an interlayer material, one of the sheets is the glass sheet and the other sheet is defined as the second sheet wherein the first surface of the laminate is the outer surface of the first sheet.

5. The method of claim 4 wherein the recess is in the first sheet and the interlayer material and the base of the recess is a portion of the second glass sheet.

6. The method of claim 5 therein the recess is a hole in the first sheet and the interlayer with a portion of the first sheet between the walls of the recess and peripheral edges of the laminate.

7. The method of claim 5 wherein the recess is a cutout in the first sheet and the interlayer with the walls of the recess extending to the peripheral surface portions of the laminate.

8. The method of claim 7 wherein the mold in cross section has a generally L-shape with the large leg of the L to be positioned on the first surface of the laminate and the shorter leg of the L engaging the peripheral surface of the laminate with the cutout covered by the resilient surface of the mold to form a cavity, the cavity defined by the resilient surface of the mold facing the wall portions and the base of the cutout and the wall portions and the base of the cutout and said moving step moves the material in the fluid state into the cavity.

9. The method of claim 8 wherein the second glass sheet has a first surface which is an outer surface of the laminate and an opposite surface defined as a second surface of the second sheet with the second surface of the second sheet having an electroconductive coating, the electroconductive coating extending into the cutout and forming a portion of the base of the cutout and further including the step of electrically contacting a portion of the conductive coating in the cutout with end portion of an electrical wire with the other end of the wire extending out of cutout over the first surface of the first sheet wherein the wire extending over the first surface of the first sheet is biased against the first surface of the first sheet when the resilient member is biased against the first surface.

10. The method of claim 9 wherein the resilient surface of the mold member has a cutout to receive the wire extending over the first surface of the first sheet and bias the wire against the first surface.

11. The method of claim 10 wherein the laminate is an automotive windshield.

12. The method of claim 1 wherein said biasing step includes the step of applying a force to selected portions of the mold to urge the resilient surface of the mold against the first surface of the article to hold the mold in place.

13. The method of claim 1 wherein said biasing step includes the step of clamping said mold to the article.

14. The method of claim 1 wherein the material is a sealant and further including the step of heating the sealant prior to the practice of said moving step to accelerate solidifying the sealant to the desired hardness.

15. The method of claim 1 further including the step of heating the mold prior to said positioning step to accelerate solidifying of the material to the desired hardness.

16. The method of claim 1 wherein the material is a sealant that hardens as it cures and further including the step of heating the mold and the sealant after the practice of said moving step to accelerate the curing of sealant.

17. The method of claim 1 further including the step of securing an electrical connector within the recess prior to the practice of said positioning step.

18. The method of claim 1 wherein the recess is formed along an edge of the article and said positioning step includes the step of positioning the resilient surface of the mold over the recess such that first portions of the mold extend along selected portions of the first surface of the article immediately adjacent the recess and second portions of the mold extend along selected portions of an edge of the article immediately adjacent the recess, wherein the mold and the recess of the article form an enclosed cavity therebetween.

19. The method of claim 18 wherein the article is a laminate having a pair of glass sheets adhered to one another to form a laminate and the first surface of the article is an outer surface of the laminate and said step includes the step of clamping said mold to the first surface of the laminate.

\* \* \* \* \*